US007130637B2

(12) United States Patent
Fisher

(10) Patent No.: US 7,130,637 B2
(45) Date of Patent: *Oct. 31, 2006

(54) METHOD FOR IMPLEMENTING FAST DYNAMIC CHANNEL ALLOCATION BACKGROUND INTERFERENCE REDUCTION PROCEDURE IN RADIO RESOURCE MANAGEMENT

(75) Inventor: Xiaochun Xu Fisher, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/747,297

(22) Filed: Dec. 29, 2003

(65) Prior Publication Data

US 2004/0258036 A1 Dec. 23, 2004

Related U.S. Application Data

(60) Provisional application No. 60/450,924, filed on Feb. 27, 2003.

(51) Int. Cl.
*H04Q 7/20* (2006.01)

(52) U.S. Cl. .............................. 455/452.1; 455/452.2; 455/450; 370/328; 370/332; 370/458

(58) Field of Classification Search ................ 455/450, 455/451, 452.1, 452.2, 464, 412.1, 414.1, 455/509, 512, 513, 63.1, 67.11, 67.13; 370/230, 370/235, 280, 241.1, 331, 335, 337, 345, 370/328, 329

See application file for complete search history.

(56) References Cited

U.S. PATENT DOCUMENTS

| 5,359,596 | A | 10/1994 | Sadiq | |
|---|---|---|---|---|
| 6,473,442 | B1* | 10/2002 | Lundsjo et al. | 370/537 |
| 6,487,415 | B1* | 11/2002 | Eibling et al. | 455/453 |
| 6,791,961 | B1* | 9/2004 | Zeira et al. | 370/335 |
| 2001/0036823 | A1 | 11/2001 | Van Lieshout et al. | |
| 2002/0003782 | A1* | 1/2002 | Pan et al. | 370/280 |
| 2002/0009061 | A1 | 1/2002 | Willenegger | |
| 2002/0094817 | A1 | 7/2002 | Rune et al. | |
| 2002/0119783 | A1 | 8/2002 | Bourlas et al. | |
| 2002/0119796 | A1 | 8/2002 | Vanghi | |
| 2003/0123388 | A1* | 7/2003 | Bradd | 370/230 |
| 2004/0214582 | A1* | 10/2004 | Lan et al. | 455/452.2 |
| 2005/0148337 | A1* | 7/2005 | Karlsson et al. | 455/453 |
| 2005/0190729 | A1* | 9/2005 | Roy et al. | 370/336 |

* cited by examiner

*Primary Examiner*—Jean Gelin
(74) *Attorney, Agent, or Firm*—Volpe and Koenig, P.C.

(57) ABSTRACT

A method of implementing a fast dynamic channel allocation background interference reduction procedure in a wireless communication system includes a pre-code allocation process, a signal-independent code allocation process, and a post-code allocation process. The pre-code allocation process receives a timer trigger signal and retrieves system measurements from a centralized database. The physical resources to be reassigned are determined based on a figure of merit. The code allocation process checks the availability of a code set in the cell and generates timeslot sequences for the available timeslots. A code set is allocated to the available timeslots in a timeslot sequence, wherein a successful assignment is a solution. The interference signal code power (ISCP) is calculated for each solution and the solution having the lowest weighted ISCP is selected as an optimal solution. The reallocation information is stored in the centralized database and is sent in a physical channel reconfiguration request message.

23 Claims, 5 Drawing Sheets

METHOD FOR IMPLEMENTING FAST DYNAMIC CHANNEL ALLOCATION BACKGROUND INTERFERENCE REDUCTION PROCEDURE IN RADIO RESOURCE MANAGEMENT

CROSS REFERENCE TO RELATED APPLICATIONS

This application claims priority from U.S. Provisional Application No. 60/450,924, filed Feb. 27, 2003, which is incorporated by reference as if fully set forth herein.

FIELD OF THE INVENTION

The present invention relates generally to radio resource management in wireless communication systems, and more particularly to an implementation of a fast dynamic channel allocation (F-DCA) background interference reduction algorithm in radio resource management (RRM).

BACKGROUND OF THE INVENTION

In wireless communication systems, RRM is generally responsible for utilizing the air interface resources. RRM is used to guarantee quality of service (QoS), to provide efficient use of the radio resources, and to increase system capacity. RRM consists of admission control, handover, power control, and congestion control functionalities. Admission control can be divided into user admission control and call admission control. User admission control accepts or rejects the radio resource control (RRC) connection requested by a wireless transmit/receive unit (WTRU). Call admission control accepts or rejects a request to establish or modify a radio access bearer (RAB) in the radio access network (RAN). Call admission control is located in the controlling radio network controller (C-RNC).

There are two dynamic channel allocation (DCA) functions, slow DCA and fast DCA (S-DCA, F-DCA). The S-DCA allocates the radio resources to cells while the F-DCA allocates the radio resources to bearer service. Two F-DCA functions, which could be in the form of algorithms, are executed by RRM at steady state operation: one for background interference reduction procedure and one for an escape mechanism.

The F-DCA background interference reduction procedure is used to keep WTRU and system resource usage at a reasonable level at all times by reassigning radio resources (timeslots and codes) to an existing radio bearer. The F-DCA background interference reduction procedure is triggered by RRM periodically. The period to trigger the background interference reduction procedure is a design parameter; in a preferred embodiment of the present invention, the period is two seconds. It has relatively low priority among the three F-DCA algorithms.

Only one F-DCA function is preferably run at a given time in a C-RNC, because the output of one function may affect the decision of another function. If more than one of these functions are triggered at exactly the same time, the priority of these functions is such that the escape procedure runs first, call admission control runs second, and the background interference reduction procedure runs last.

It is desirable to provide an implementation of the background interference reduction procedure, which satisfies the foregoing requirements.

SUMMARY OF THE INVENTION

The present invention provides a method for implementing the F-DCA background interference reduction procedure in RRM. The present invention alters the previously implemented F-DCA algorithm such that the channel allocation function is modified and reused in the implementation of F-DCA background interference reduction procedure. More specifically, certain functions in the previous implementations of the F-DCA algorithm that are signal-dependent are altered to become signal-independent by the present invention, such that the altered functions are reusable in the implementation of the background interference reduction algorithm.

A method of implementing a fast dynamic channel allocation (F-DCA) background interference reduction procedure in a wireless communication system includes a pre-code allocation procedure, a signal-independent code allocation procedure, and a post-code allocation procedure. The pre-code allocation procedure receives a background timer trigger signal; obtains both WTRU and Node B measurements from an RRC shared cell database; obtains both cell and WTRU information from a centralized database; determines the candidate timeslots (one for the uplink direction and one for the downlink direction) to be reassigned; retrieves a list of the available timeslots to be used for reassignment from a centralized database; and determines the candidate code sets to be reassigned. The code allocation procedure checks the availability of a code set in the cell; checks the transmission power of a candidate timeslot; generates timeslot sequences for the available timeslots; assigns a code set to the available timeslots in a timeslot sequence, wherein a successful assignment is a solution; calculates an interference signal code power (ISCP) for each solution; and selects the solution having the lowest weighted ISCP as an optimal solution. The post-code allocation procedure stores the reallocation information in the centralized database and creates a physical channel reconfiguration request message.

A method of implementing a fast dynamic channel allocation (F-DCA) background interference reduction procedure in a wireless communication system includes a pre-code allocation process, a signal-independent code allocation process, and a post-code allocation process. The pre-code allocation process begins by receiving a timer trigger signal. System measurements are retrieved from a centralized database. The physical resources to be reassigned are determined based on a figure of merit. The code allocation process begins by checking the availability of a code set in the cell and generating timeslot sequences for the available timeslots. A code set is allocated to the available timeslots in a timeslot sequence, wherein a successful assignment is a solution. The interference signal code power (ISCP) is calculated for each solution and the solution having the lowest weighted ISCP is selected as an optimal solution. The reallocation information is stored in the centralized database. A physical channel reconfiguration request message is sent, containing the allocation information.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF PREFERRED EMBODIMENT

Figure 1:
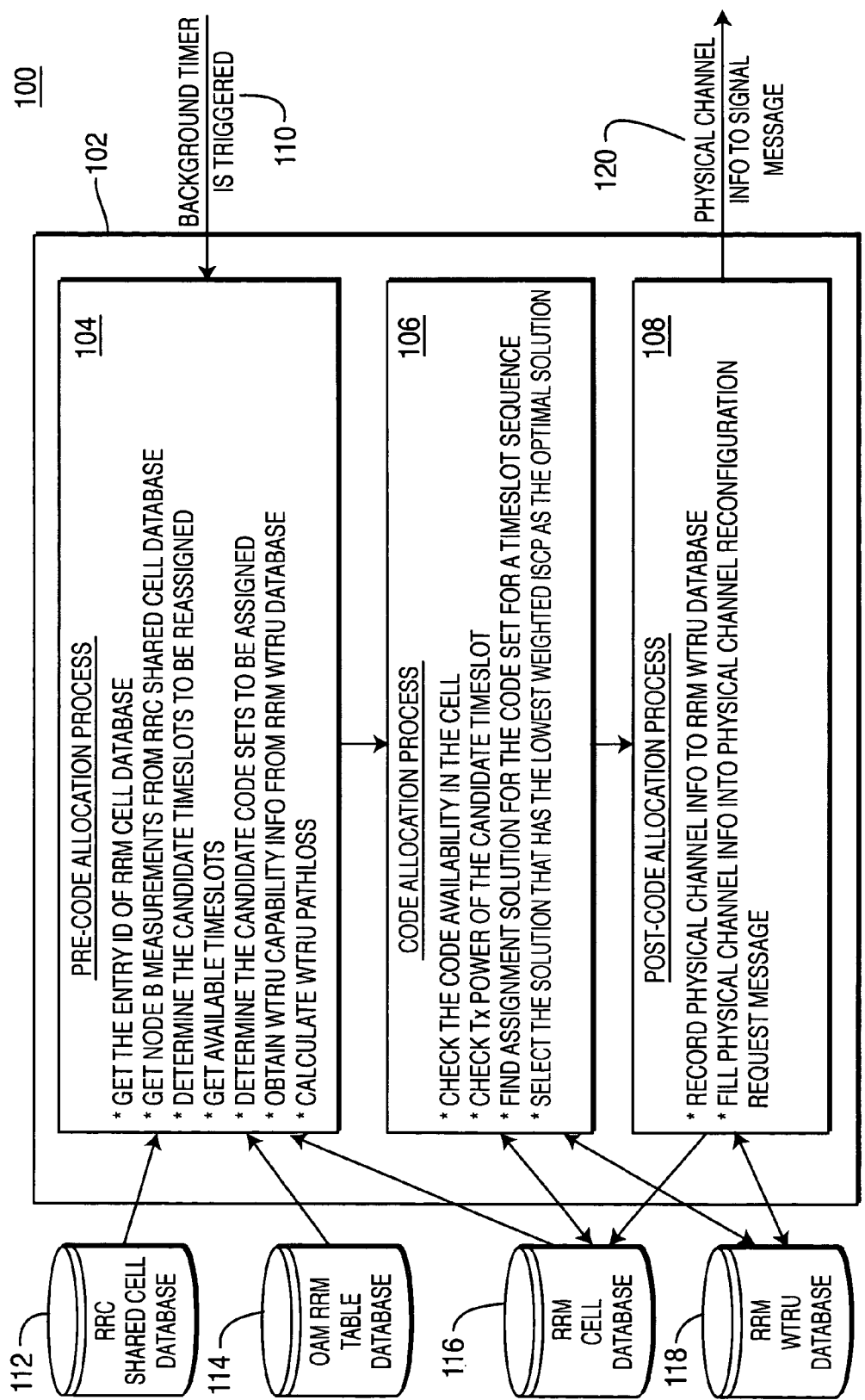
FIG. 1 is an overview of a F-DCA background interference reduction procedure in accordance with the present invention.

An overview 100 of the F-DCA background interference reduction procedure 102 is shown in FIG. 1. The main function of the F-DCA background interference reduction procedure 102 consists of three parts: the pre-code allocation process 104, the code allocation process 106, and the post-code allocation process 108. The pre-code allocation process 104 is started upon receipt of a background timer trigger signal 110. The pre-code allocation process 104 gets the entry identification of a RRM cell database 116, gets Node B measurements from a RRC shared cell database 112, determines the candidate timeslots to be reassigned (one uplink (UL) timeslot and one downlink (DL) timeslot), retrieves a list of the available timeslots to be used for reassignment from the RRM cell database 116, determines the candidate code sets to be reassigned in the candidate timeslot in both directions, obtains WTRU capability information from a RRM WTRU database 118, and calculates the WTRU pathloss.

The code allocation process 106 checks the code availability in the cell, checks the transmission (Tx) power of the candidate timeslot, finds the assignment solution for the code set for a timeslot sequence (by assigning the candidate code set to the available timeslots), and selects the solution that has the lowest weighted interference signal code power (ISCP) as the optimal solution. The post-code allocation process 108 is responsible for recording the reallocated physical channels in the RRM WTRU database 118 and filling the physical channel information into a physical channel reconfiguration request message 120.

In addition to the data exchanges between the processes and the databases, there are data exchanges occurring directly between the processes. The WTRU measurements, the Node B measurements, a list of available timeslots in the cell, a candidate code set, and WTRU capability information are passed from the pre-code allocation process 104 to the code allocation process 106. The physical channel information (a list of timeslots and channelized codes in each timeslot) are passed from the code allocation process 106 to the post-code allocation process 108.

In the present invention, the functions of the F-DCA background interference reduction procedure 102 are modularized into two groups of functions: signal-dependent functions whose inputs are parts of signal messages and signal-independent functions whose inputs are independent of signal messages. The purpose of separating the signal-dependent functions and the signal-independent functions is to increase the reusability of the signal-independent functions. The functions of both the pre-code allocation process 104 and the post-code allocation process 108 are signal-dependent functions. In contrast, the functions of the code allocation process 106 are signal-independent functions. Therefore, the reusability of signal-independent functions is higher than that of the signal-dependent functions. Certain functions which are inherently signal-dependent are converted in the preferred embodiment of the present invention from being signal-dependent to signal-independent, thereby increasing the reusability of the converted functions.

Figure 2A:
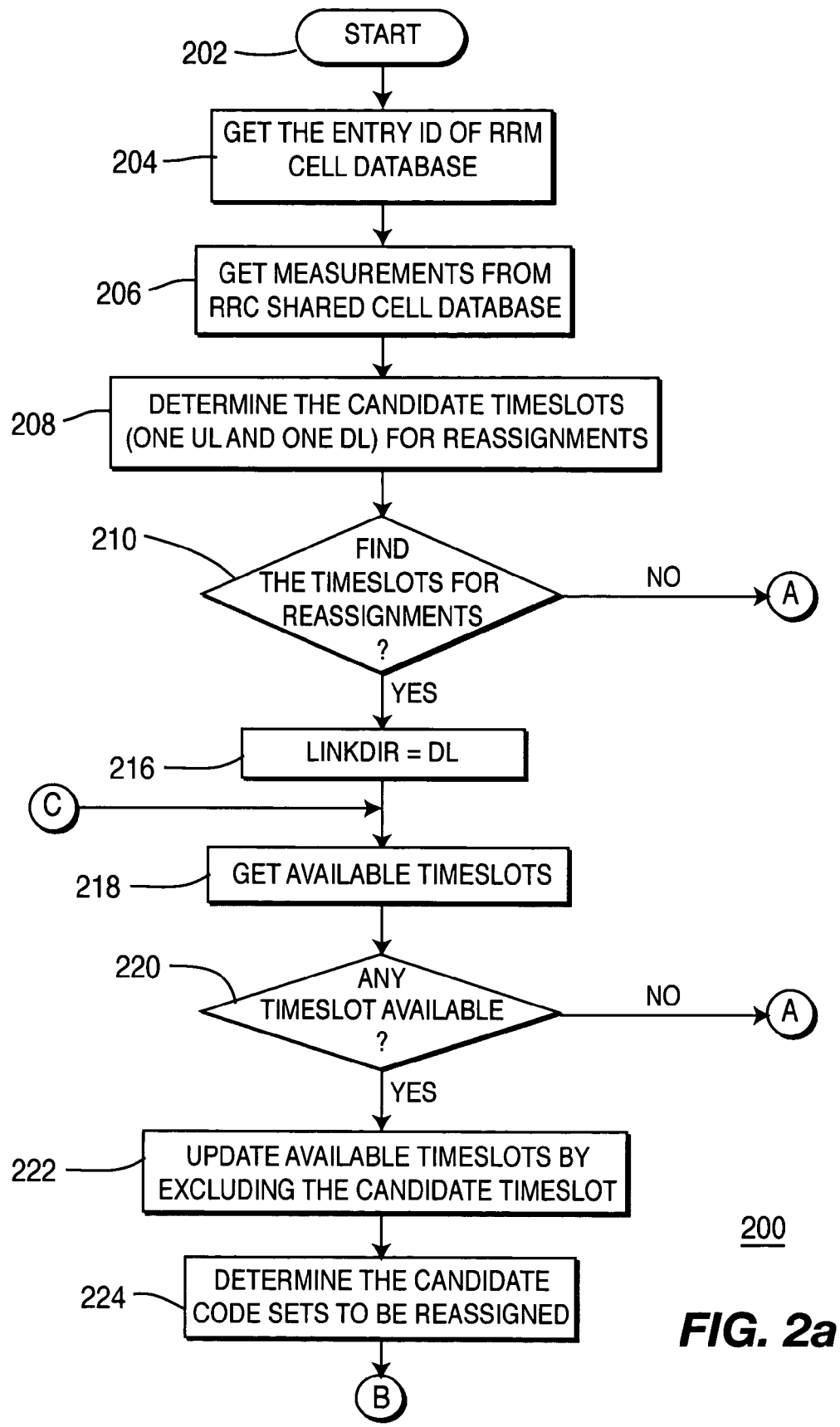
FIGS. 2a and 2b show a flowchart of the F-DCA background interference reduction procedure shown in FIG. 1.
Figure 2B:
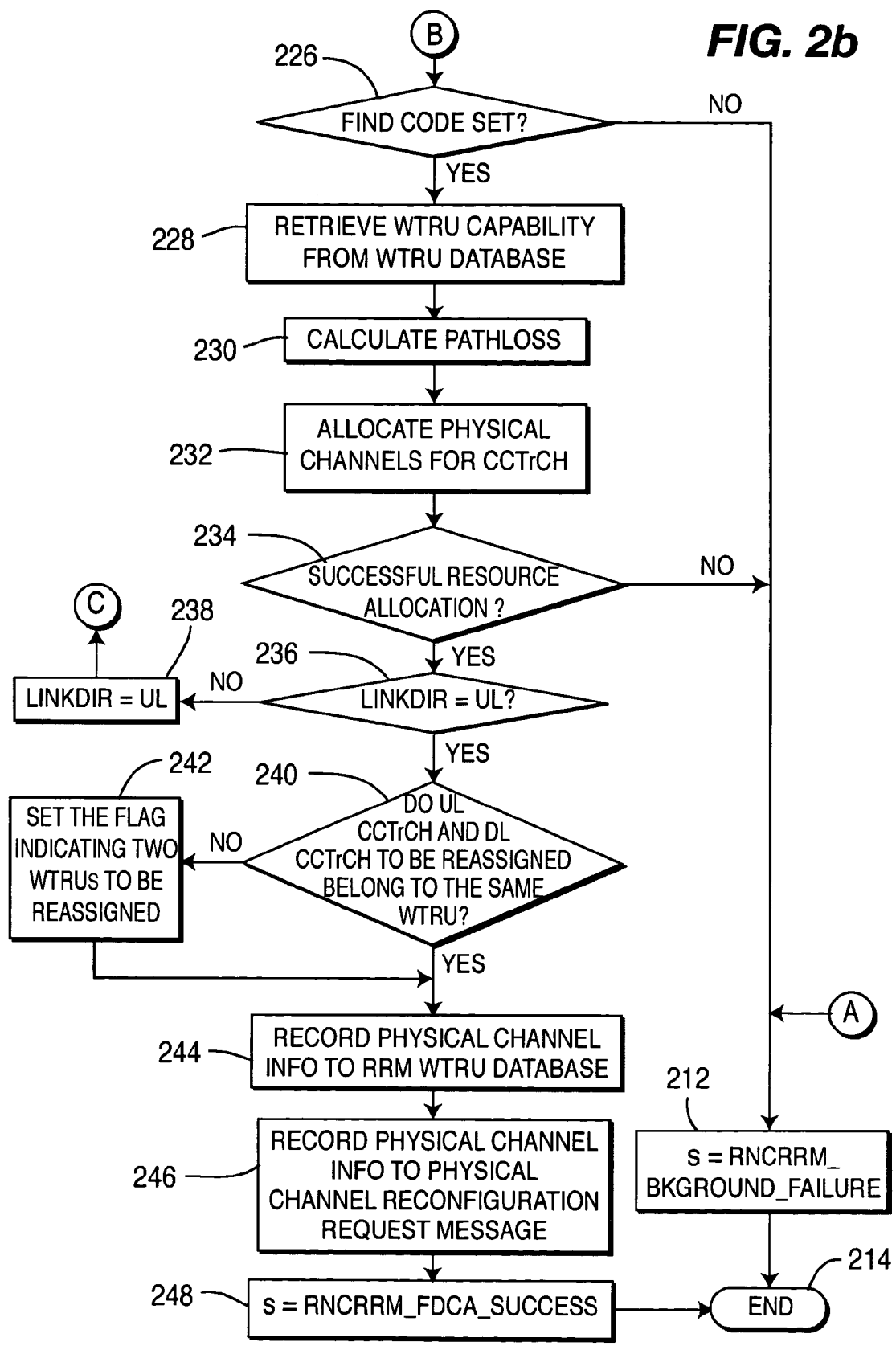
Figure 3A:
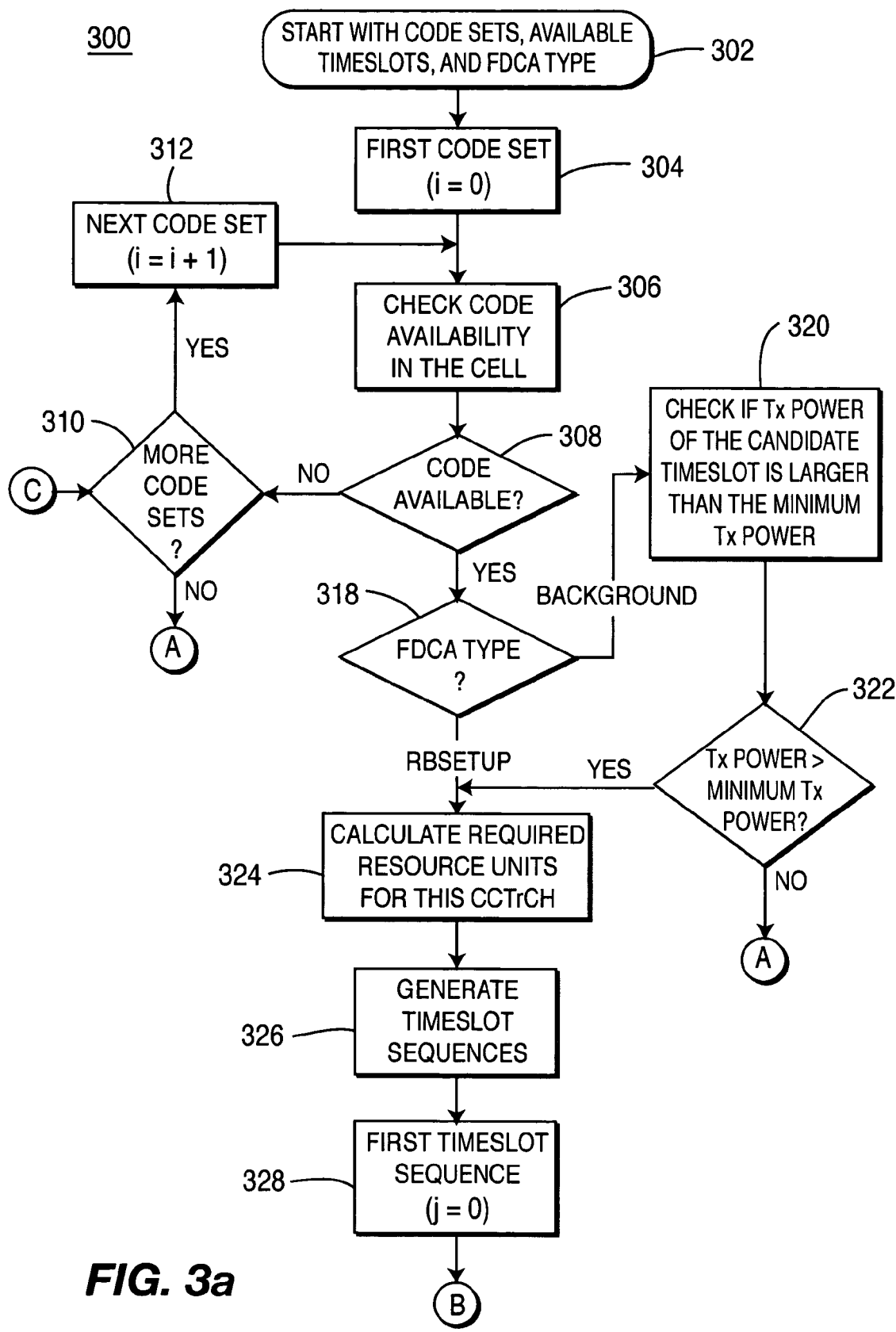
FIGS. 3a and 3b show a flowchart of the channel allocation function for the background interference reduction procedure shown in FIG. 2.
Figure 3B:
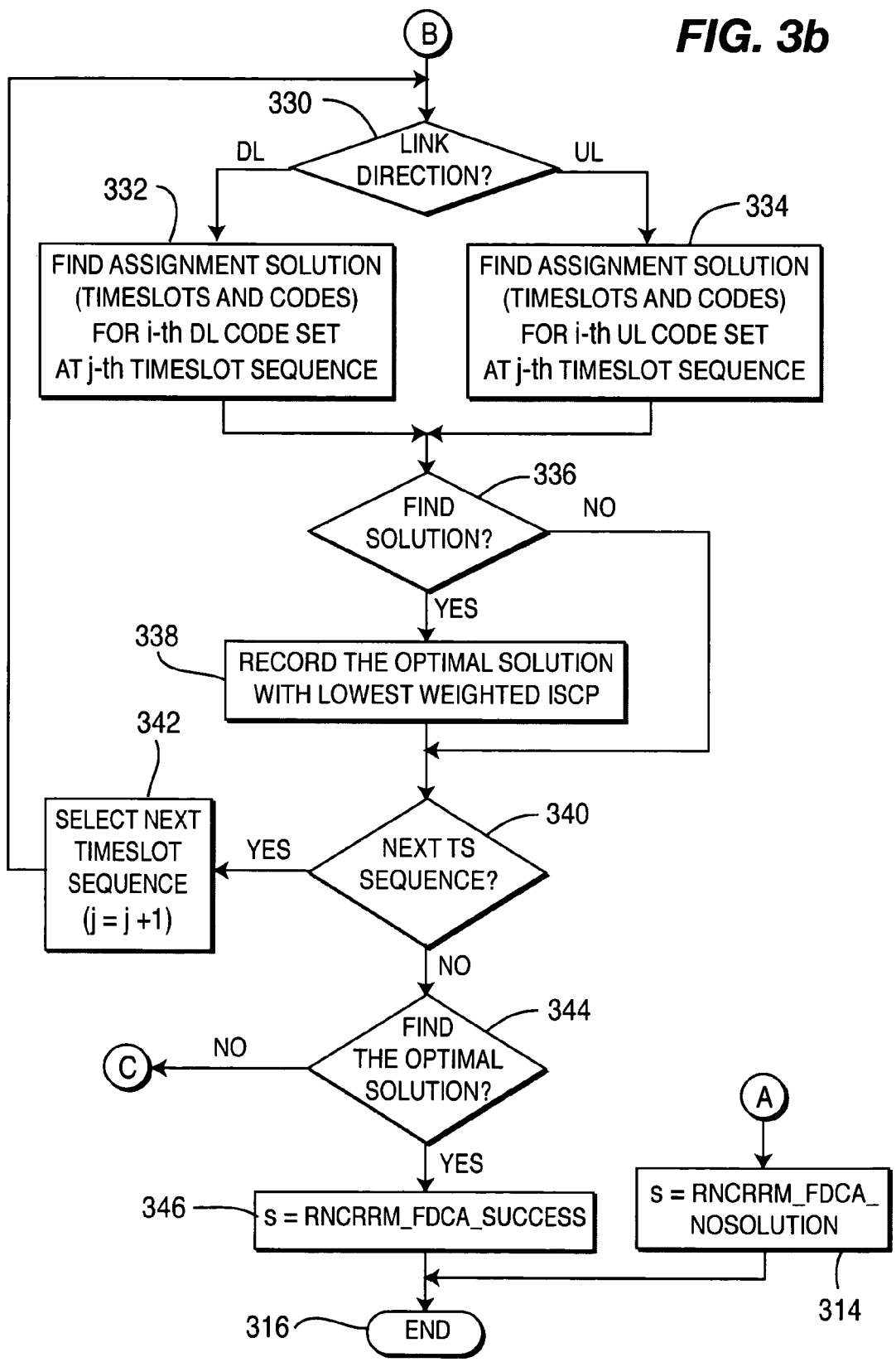

The flowcharts for functions of the F-DCA background interference reduction procedure are shown in FIGS. 2a, 2b, 3a, and 3b. FIGS. 2a and 2b show a flowchart of the main background interference reduction procedure 200, which begins (step 202) by retrieving the entry identification of the RRM cell database (step 204). The WTRU measurements and the Node B measurements are retrieved from the shared cell database (step 206). The candidate timeslots for reassignment are determined, one UL timeslot and one DL timeslot, based upon a figure of merit of the timeslots (step 208). The timeslot with the lowest figure of merit is selected as the candidate for reassignment. If there are no timeslots to be reassigned (step 210), a status flag is set to indicate a failure condition (step 212), and the procedure terminates (step 214). If there are timeslots to be reassigned (step 210), then the link direction is set to the downlink (step 216). It is noted that the order of evaluation of link direction is arbitrary, and either the UL or the DL can be evaluated first.

The available timeslots in the cell for the selected link direction are retrieved (step 218). If there are no timeslots available (step 220), then the status flag is set to indicate a failure condition (step 212), and the procedure terminates (step 214). If there are available timeslots (step 220), then the list of available timeslots is updated to exclude the candidate timeslot (step 222). The candidate code sets to be reassigned are determined in the candidate timeslots based on a figure of merit of the codes (step 224). The code with the lowest figure of merit is selected as the candidate for reassignment. If there are no code sets to be reassigned (step 226), then the status flag is set to indicate a failure condition (step 212), and the procedure terminates (step 214). If there are code sets to be reassigned (step 226), then the WTRU capability information is retrieved from the WTRU database (step 228).

The pathloss of the WTRU is calculated (step 230), and the physical channels for the current coded composite transport channel (CCTrCH) are reallocated (step 232). If the channel reallocation is not successful (step 234), then status flag is set to indicate a failure condition (step 212), and the procedure terminates (step 214). If the channel reallocation is successful (step 234), then a determination is made whether the link direction is currently UL (step 236). If the link direction is currently DL, then the link direction is set to UL (step 238) and the method continues with step 218.

If the current link direction is UL (step 236), then a determination is made whether the UL CCTrCH and the DL CCTrCH to be reassigned belong to the same WTRU (step 240). If the CCTrCHs to be reassigned belong to different WTRUs, then a flag is set to indicate that two different WTRUs are to be reassigned (step 242). If the CCTrCHs belong to the same WTRU (step 240) or if the flag has been set (step 242), then the physical channel allocation information is recorded in the RRM WTRU database (step 244). The physical channel information includes a list of dedicated physical channel timeslot information, a repetition period value, and a repetition length value. The dedicated physical channel timeslot information includes the timeslot number, the midamble shift and burst type, the transport format code indicator (TFCI) presence, and a list of code information. The code information includes the channelized code, the code usage status, the dedicated physical channel (DPCH) identification, and the code signal to interference ratio (SIR) target.

The physical channel allocation information is also recorded into a physical channel reconfiguration request message (step 246), the status flag is set to indicate "success" (step 248), and the procedure terminates (step 214). If the flag indicates that two WTRUs have CCTrCHs being reassigned (step 242), the corresponding physical channel information for two WTRUs is recorded (step 244) and two physical channel reconfiguration request messages are sent (step 246). The physical channel reconfiguration request message includes the following information: the WTRU identification, the C-RNC identification, the radio link identification, the radio resource control transaction identification, UL CCTrCH information, and DL CCTrCH information.

Step 232 relates to calling the core function of the F-DCA background interference reduction procedure to reallocate the physical channels. This core function 300 is signal-independent and is described in connection with FIGS. 3*a* and 3*b*. The function 300 begins by receiving the code sets, the available timeslots, and an F-DCA type indicator as inputs (step 302). The first code set is selected (step 304) and a determination is made whether the code set is available in the cell (steps 306 and 308). If the selected code set is not available in the cell (step 308), then a determination is made whether there are more code sets to be examined (step 310). If there are more code sets, then the next code set is selected (step 312) and the function continues with step 306. If there are no more code sets (step 310), this indicates a failure condition, and a status flag is set to indicate that no solution is available (step 314) and the function terminates (step 316).

If the selected code set is available in the cell (step 308), then the F-DCA type is checked (step 318). The F-DCA type is set based on different RRM functions such as radio bearer setup ("RBSETUP"), escape mechanism, and background interference reduction. In the background interference reduction procedure, the F-DCA type is set to "BACKGROUND," and it can be set at any step before step 232 above. If the F-DCA type is "BACKGROUND," then the transmission power of the candidate timeslot is checked to determine if it is larger than the minimum required transmission power (step 320). If the candidate timeslot transmission power is less than the minimum value (step 322), then the status flag is set to indicate that no solution is available (step 314) and the function terminates (step 316).

If the transmission power of the candidate timeslot is greater than the minimum transmission power (step 322) or if the F-DCA type is "RBSETUP" (step 318), then the required resource units for the code set in the CCTrCH are calculated (step 324). The timeslot sequences are generated (step 326) and the first timeslot sequence is selected (step 328). The link direction, either downlink (DL) or uplink (UL), is then determined (step 330). If the link direction is DL, then an attempt is made to assign the current DL code set into the available timeslots in the current timeslot sequence (step 332). If the link direction is UL (step 330), then an attempt is made to assign the current UL code set into the available timeslots in the current timeslot sequence (step 334). In an alternate embodiment of the present invention (not shown), step 330 can be eliminated and steps 332 and 334 can be combined into a single step, to provide additional optimization.

After an attempt has been made to assign the current code set to the current timeslot sequence (steps 332, 334), a determination is made whether an assignment solution has been found (step 336), indicating that the code set was successfully assigned to the timeslot sequence. If a solution has been found, then the interference signal code power (ISCP) of the solution is determined, and the solution having the lowest weighted ISCP is considered to be the optimal solution and is recorded (step 338). If no solution was found (step 336), then step 338 is skipped.

Next, a determination is made whether there are any additional timeslot sequences to be considered (step 340). If there are additional timeslot sequences, then the next timeslot sequence is selected (step 342) and the function continues with step 330. If there are no additional timeslot sequences (step 340), then a determination is made whether an optimal solution has been found (step 344). If no optimal solution has been found, then the function continues with step 310. If the optimal solution has been found (step 344), then the status flag is set to indicate a successful assignment (step 346) and the function terminates (step 316).

In previous implementations of the F-DCA call admission control function, the functions 332 and 334 are signal-dependent. In the present invention, these two functions are modified to become signal-independent functions. All related functions used in these two functions are also modified to become signal-independent functions. Because the inputs of the functions 332 and 334 are independent of the signal message, the functions 332 and 334 can be used by other RRM procedures.

It is noted that the above-described implementation of the F-DCA background interference reduction procedure is exemplary and can be further optimized. For example, as discussed above, steps 332 and 334 can be combined into a single step, and step 330 can be eliminated. Although the preferred embodiments are described in conjunction with a third generation partnership program (3GPP) wideband code division multiple access (W-CDMA) system utilizing the time division duplex (TDD) mode, the embodiments are applicable to any hybrid code division multiple access (CDMA)/time division multiple access (TDMA) communication system. Additionally, some embodiments are applicable to CDMA systems, in general, using beamforming, such as the proposed frequency division duplex (FDD) mode of 3GPP W-CDMA. While specific embodiments of the present invention have been shown and described, many modifications and variations could be made by one skilled in the art without departing from the scope of the invention. The above description serves to illustrate and not limit the particular invention in any way.

What is claimed is:

1. A method of implementing a fast dynamic channel allocation background interference reduction procedure in a wireless communication system, comprising:
    a pre-code allocation procedure;
    a signal-independent code allocation procedure, including:
        checking the availability of a code set in the cell;
        checking the transmission power of a candidate timeslot;
        generating timeslot sequences for the available timeslots;
        assigning a code set to the available timeslots in a timeslot sequence, wherein a successful assignment is a solution;
        calculating the interference signal code power (ISCP) for each solution; and
        selecting the solution having the lowest weighted ISCP as an optimal solution; and
    a post-code allocation procedure.

2. The method according to claim 1, wherein the pre-code allocation procedure includes:
    receiving a trigger signal;
    obtaining Node B measurements;
    retrieving cell configuration information;
    determining the candidate timeslots for both directions to be reassigned;
    determining the candidate code sets for each direction to be reassigned;

obtaining wireless transmit/receive unit information from a centralized database; and obtaining a list of the available timeslots from the centralized database.

3. The method according to claim 1, wherein the post-code allocation procedure includes:

storing reallocation information in a centralized database; and creating a physical channel reconfiguration request message.

4. A method of implementing a fast dynamic channel allocation background interference reduction procedure in a wireless communication system, comprising the steps of:

receiving a trigger signal to initiate the background interference reduction procedure;

retrieving system measurements from a centralized database;

determining physical resources to be reassigned;

retrieving a list of available timeslots from the centralized database;

retrieving wireless transmit/receive unit (WTRU) capability information from the centralized database;

allocating a code set to the available timeslots in a timeslot sequence;

storing the reallocation information in the centralized database; and sending a physical channel reconfiguration request message containing the reallocation information.

5. The method according to claim 4, wherein the retrieving WTRU capability information step includes:

reading WTRU measurements from the centralized database; and reading Node B measurements from the centralized database.

6. The method according to claim 5, wherein the WTRU measurements include downlink interference signal code power.

7. The method according to claim 5, wherein the Node B measurements include:

common measurements, including uplink signal interference signal code power and downlink transmitted carrier power; and dedicated measurements, including downlink transmitted code power.

8. The method according to claim 4, wherein the determining step includes:

determining candidate timeslots to be reassigned, one timeslot on the uplink direction and one timeslot on the downlink direction; and determining candidate code sets in the candidate timeslots to be reassigned.

9. The method according to claim 8, wherein the candidate timeslot is one that has the lowest figure of merit.

10. The method according to claim 8, wherein the candidate code sets are those that have the lowest figure of merit.

11. The method according to claim 4, wherein the retrieving WTRU capability information includes:

uplink WTRU capability information, including:

a maximum number of time slots per frame; and a maximum number of uplink physical channels per timeslot; and downlink WTRU capability information, including:

a maximum number of timeslots per frame; and a maximum number of downlink physical channels per frame.

12. The method according to claim 4, wherein the allocating step includes:

checking the availability of a code set in the cell;

checking the transmission power of a candidate timeslot;

generating timeslot sequences from the list of available timeslots; and assigning a code set to the available timeslots in a timeslot sequence to find a solution, wherein a successful assignment is a solution.

13. The method according to claim 12, wherein the allocating step further includes:

calculating an interference signal code power (ISCP) value for the solution; and selecting the solution having the lowest weighted ISCP value as an optimal solution.

14. The method according to claim 4, wherein the storing step includes recording physical channel information in the centralized database.

15. The method according to claim 14, wherein the physical channel information includes:

dedicated physical channel timeslot information;

a repetition period value; and a repetition length value.

16. The method according to claim 15, wherein the dedicated physical channel timeslot information includes:

the timeslot number;

a midamble shift and burst type;

a transport format combination indicator presence; and code information.

17. The method according to claim 16, wherein the code information includes:

a channelized code;

a code usage status;

a dedicated physical channel identification; and a code signal to interference target.

18. The method according to claim 4, wherein the sending step includes filling the physical channel reconfiguration request message.

19. The method according to claim 18, wherein the physical channel reconfiguration message includes:

a WTRU identification;

a controlling radio network controller identification;

a radio link identification;

a radio resource control identification;

uplink coded composite transport channel (CCTrCH) information; and downlink CCTrCH information.

20. The method according to claim 19, wherein the CCTrCH information includes dedicated physical channel (DPCH) information.

21. The method according to claim 20, wherein the DPCH information includes DPCH timeslot information.

22. The method according to claim 21, wherein the DPCH timeslot information includes:

the timeslot number;

a midamble shift and burst type;

a transport format combination indicator presence; and code information.

23. The method according to claim 22, wherein the code information includes:

the DPCH identification; and a channelization code.

* * * * *

UNITED STATES PATENT AND TRADEMARK OFFICE
CERTIFICATE OF CORRECTION

PATENT NO. : 7,130,637 B2
APPLICATION NO. : 10/747297
DATED : October 31, 2006
INVENTOR(S) : Xiaochun Xu Fisher It is certified that error appears in the above-identified patent and that said Letters Patent is hereby corrected as shown below:

ON THE TITLE PAGE

At item (56), U.S. PATENT DOCUMENTS, page 1, right column, after "5,359,596 A 10/1994 Sadiq ", insert --6,246,881  6/2001 Parantainen et al.--.

At item (56), U.S. PATENT DOCUMENTS, page 1, right column, after "2002/0119796 A1  8/2002 Vanghi", insert --2002/0181550  12/2002 Zeira et al.--.

At item (56), page 1, right column, after "U.S. PATENT DOCUMENTS", insert
--FOREIGN PATENT DOCUMENTS,
0940999   09/1999   EP
00/18034   03/2000   WO
01/35692   05/2001   WO
02/05441   01/2002   WO--.

Signed and Sealed this

Fourth Day of December, 2007

JON W. DUDAS
*Director of the United States Patent and Trademark Office*